Figure 1:
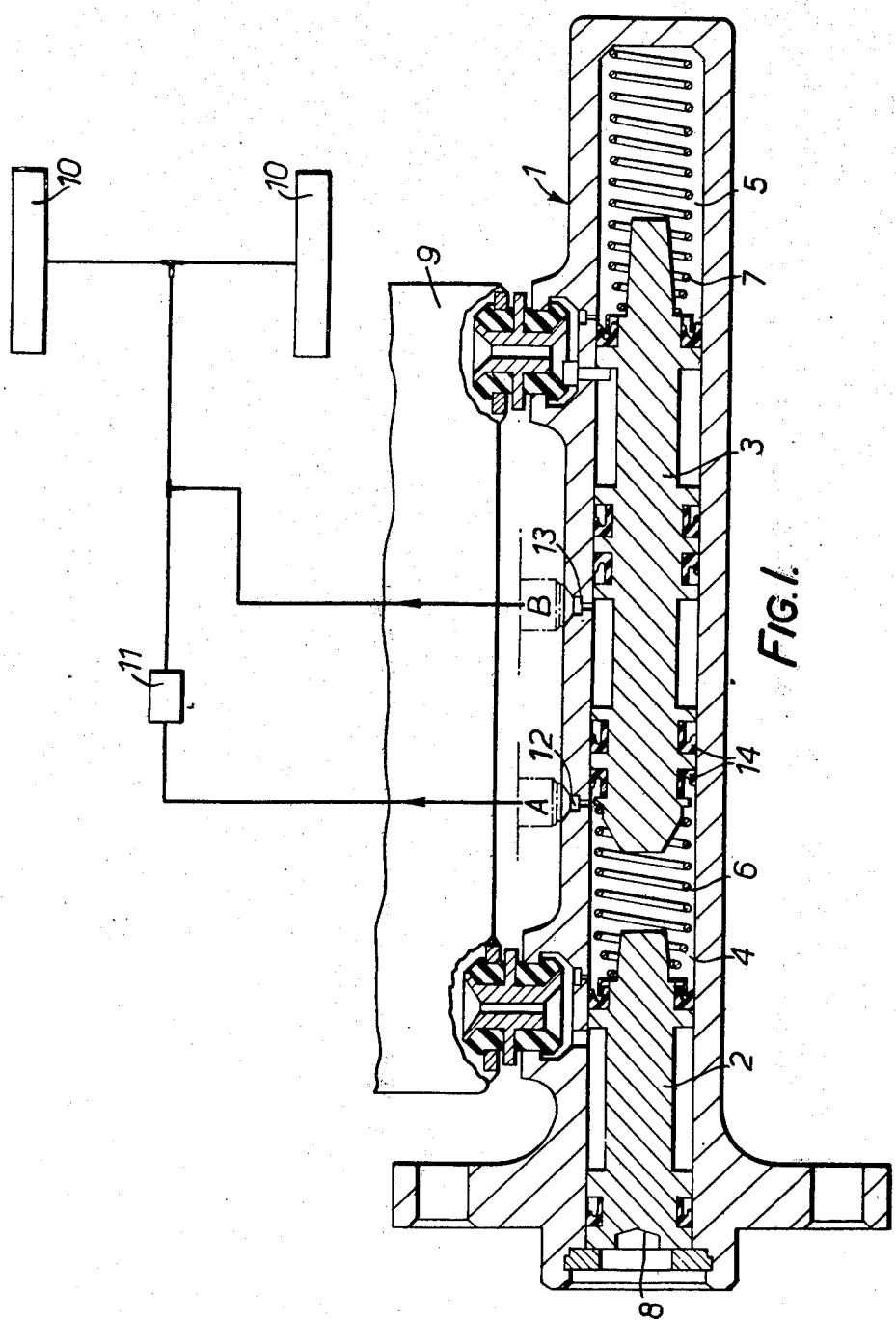

United States Patent [19]
Carey

[11] 3,922,857
[45] Dec. 2, 1975

[54] VEHICLE DUAL BRAKING SYSTEMS
[75] Inventor: Michael Albert Carey, Birmingham, England
[73] Assignee: Girling Limited, Birmingham, England
[22] Filed: Nov. 2, 1973
[21] Appl. No.: 412,122

[30] Foreign Application Priority Data
Nov. 17, 1972 United Kingdom............... 53322/72
Feb. 8, 1973 United Kingdom................. 6317/73

[52] U.S. Cl..................... 60/562; 303/6 C; 60/582
[51] Int. Cl.²................................... F15B 7/00
[58] Field of Search ....... 60/582, 562, 591; 303/6 C

[56] References Cited
UNITED STATES PATENTS

| | | | |
|---|---|---|---|
| 3,661,426 | 5/1972 | Tam | 303/6 C |
| 3,674,954 | 7/1972 | Kish et al. | 303/6 C |
| 3,686,864 | 8/1972 | Shutt | 200/82 D |
| 3,701,567 | 10/1972 | Shutt et al. | 303/6 C |
| 3,727,989 | 4/1973 | Keady | 303/6 C |
| 3,774,973 | 11/1973 | Baldwin | 303/6 C |

*Primary Examiner*—Martin P. Schwadron
*Assistant Examiner*—H. Burks, Sr.
*Attorney, Agent, or Firm*—Scrivener Parker Scrivener and Clarke

[57] ABSTRACT

A pressure generating device for a vehicle braking system comprises pressure generating members, preferably pistons of a tandem master cylinder, and pressure chambers, preferably chambers of a master cylinder, one of which is connected through a control valve to a vehicle brake. An operating valve is provided which is directly and positively actuated in response to predetermined excess movement of one of the members, upon a pressure failure in one of the chambers, to pass the full pressure of the other chamber to the wheel brake, rendering the control valve effectively inoperative.

7 Claims, 4 Drawing Figures

VEHICLE DUAL BRAKING SYSTEMS

This invention relates to vehicle dual braking systems and particularly to pressure generating means for use in such systems.

Dual braking systems are known in which the braking pressure applied to the rear wheels is reduced by a suitable pressure control valve, such as a pressure reducing or limiting valve, whilst full braking pressure is applied to the front wheels. Such known systems often include a pressure or pressure differential responsive device which by-passes or renders inoperative the reducing or limiting valve in the event of a failure in the front brake pressure line. The pressure responsive device is usually positioned in the pressure lines between a pressure generating means, for example master cylinder, and the front and rear wheel brakes.

The pressure responsive device which is separate from the master cylinder adds to the cost of the system itself and to the cost of installation. Furthermore, in some known systems failure of a seal in the pressure responsive device could render the device inoperative and permit full braking pressure to pass to the rear brakes at each braking operation.

In accordance with the invention there is provided in or for a vehicle braking system comprising a wheel brake and a brake pressure control valve operatively connected between the brake and a fluid pressure source, a pressure generating device comprising a plurality of movable pressure generating members for generating pressure in respective pressure chambers, one of which constitutes said source, mechanical actuating means for effecting movement of the pressure generating members, and disabling means positively operable in response to predetermined excess movement of one of the pressure generating members upon loss of pressure in one of the chambers to disable or by-pass the control valve and thus ensure the transmission of full pressure from another of said chambers to the wheel brake.

Four embodiments of a braking system in accordance with the invention incorporating a master cylinder will now be described, by way of example, with reference to the accompanying drawings in which FIGS. 1 to 4 illustrate diagrammatically parts of the four embodiments of the braking system, respectively, showing cross-sectional views of the master cylinders therein.

The master cylinder in each of the illustrated embodiments is a tandem master cylinder having a housing 1, a primary piston 2 and a secondary piston 3 sealingly slidable in the cylinder and defining with the housing primary and secondary chambers 4 and 5 respectively. The pistons 2 and 3 are separated by a compression spring 6, and a further compression spring 7 acts between one end of the housing 1 and the secondary piston 3 to bias the latter to the left as seen in the drawings. Actuating means for operating the master cylinder comprise a brake pedal, servo push rod or other actuator which moves a push rod (not shown) seating in a recess 8 in the outer end of primary piston 2. A reservoir 9 supplies the master cylinder with fluid in known manner.

In normal operation, actuation of the brake pedal moves the push rod and primary piston 2 to the right and pressurises the fluid in primary chamber 4 effecting, together with the load induced in the spring, movement of the secondary piston 3 to pressurise the fluid in the secondary chamber 5. The secondary chamber 5 is connected directly to the front wheel brakes so that the full operating pressure is applied thereto, while the primary chamber 4 is connected to the rear wheel brakes through a control valve 11, for example a pressure reducer or limiting valve, so that a pressure less than the full operating pressure is applied to the brakes on the rear wheels 10.

Referring now to FIG. 1, the primary chamber 4 is connected to the control valve 11 through port 12 and a further port 13 opens into the cylinder intermediate the ends of secondary piston 3 and connects the cylinder directly to the rear wheel brakes. In normal operation however, the port 13 is subjected to the same fluid pressure as the rear brakes.

In the event of a failure in the pressure line to the front wheel brakes, movement of the secondary piston 3 is not limited by pressure build-up in the secondary chamber 5. Upon operation of the brakes, the piston 3 thus bottoms in the cylinder and seals 14 slide over the port 13 and opens it to the primary chamber 4 with the result that the control valve 11 is by-passed and the full pressure in chamber 4 is applied to the rear wheel brakes. The seals 14 of piston 3 thus co-operates with the port 13 to form a valve for by-passing the control valve 11.

Figure 2:
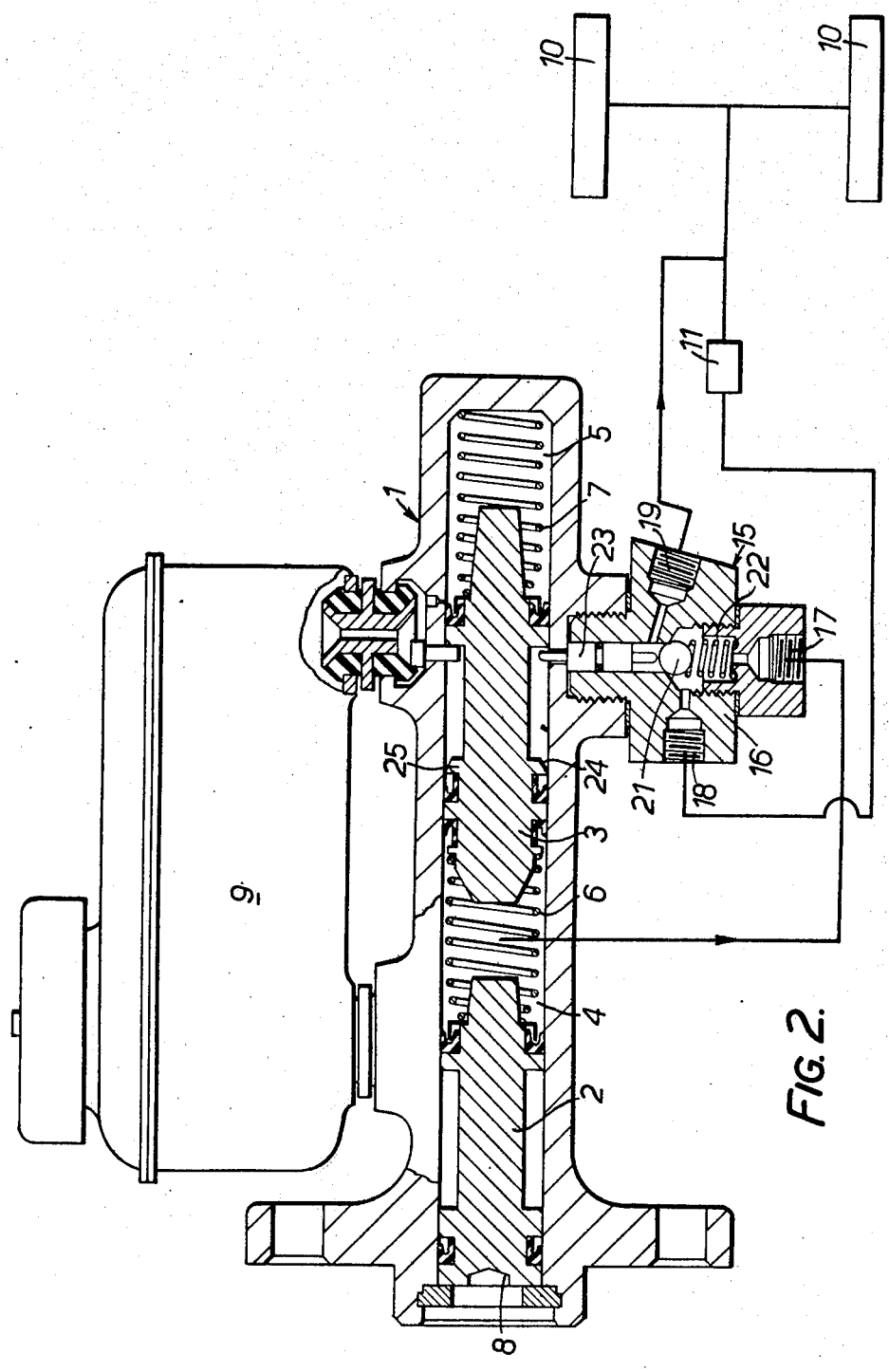

Referring now to the embodiment of FIG. 2, a valve assembly 15 is connected to the side of the cylinder housing 1 and comprises a housing 16 having a port 17 connected directly to the primary chamber 2 a port 18 connected through the control valve 11 to the rear wheel brakes and a port 19 connected directly to the rear wheel brakes. A ball valve member 21 is biassed into engagement with its seat by a compression spring 22 and, in operation, by the pressure of primary chamber 4 and is movable away from the seat by a valve stem 23 which protrudes through the cylinder housing 1 and which is arranged to be engaged by abutment means in the recess such as a frusto-conical surface 24 formed on an annular flange 25 of the secondary piston 3.

In normal operation, when the foot pedal is actuated the pressure in the primary chamber 4 is transfered through the ports 17 and 18 and the control valve 11 to the rear wheel brakes. If the front wheel brake pressure line fails the secondary piston 3 bottoms in the cylinder when the brakes are actuated and the frusto conical surface 24 engages the valve stem 23 to lift the ball valve member 21 from its seat. Thus, the pressure in the primary chamber 4 is transfered directly to the rear wheel brakes through ports 17 and 19, the reducer valve 11 being by-passed.

Figure 3:
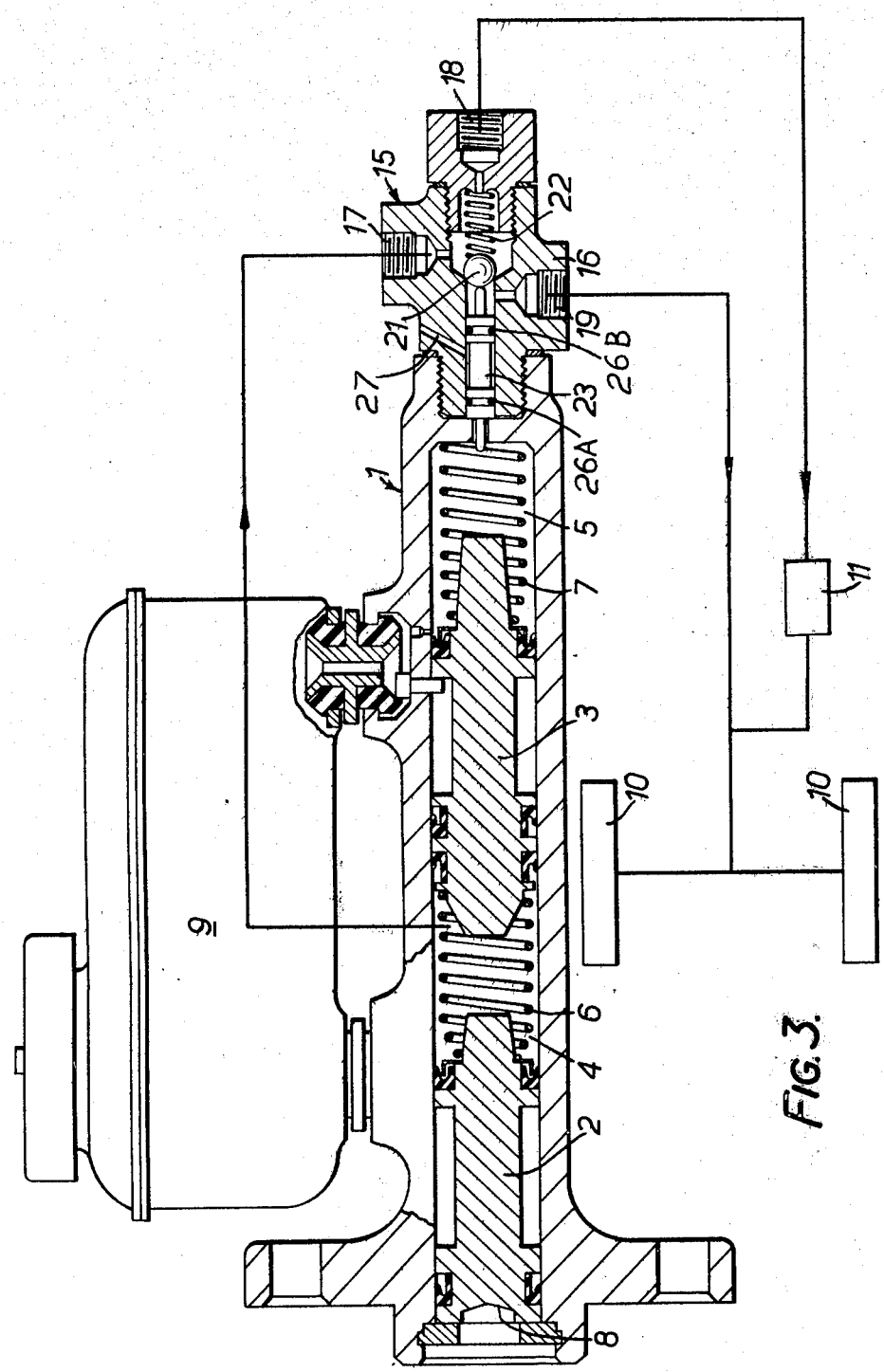

The embodiment of FIG. 3 is generally similar to that of FIG. 2, the main difference being that the valve assembly 15 is mounted on the end of the cylinder housing 1 and the valve stem 23 is moved by its engagement with the end of the secondary piston 3.

The valve stem 23 carries a pair of seals 26A, 26B and the space between them is vented through passageway 27 so that failure of either of the seals can be detected by leakage through the passageway 27.

Figure 4:
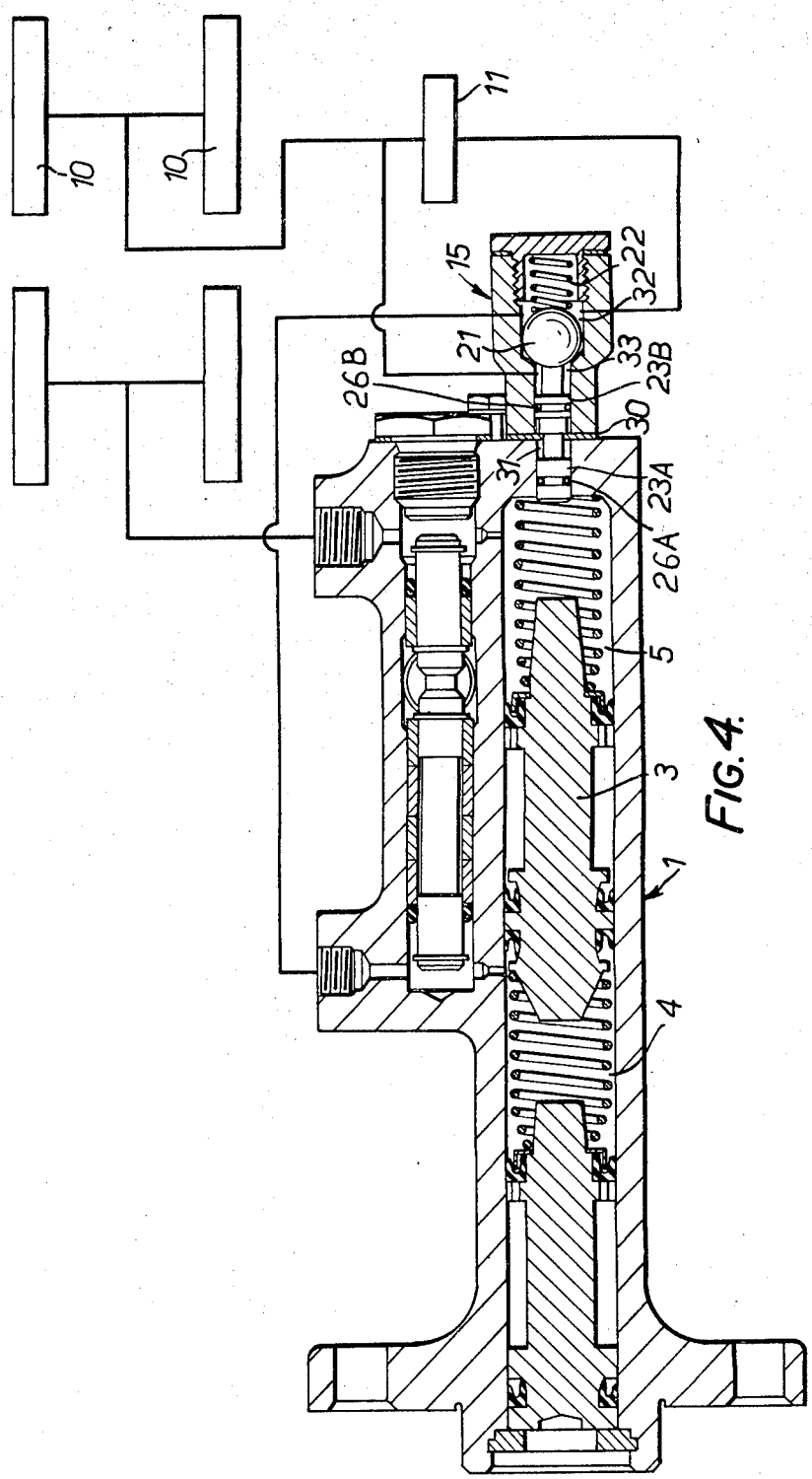

The braking system of FIG. 4 is generally similar to that of FIG. 3, the main difference between the two systems referred to being in the construction and operation of the valve assembly 15. In the system of FIG. 4 the valve stem 23 is constituted by two separate pistons 23A and 23B sealingly slidable in the end of housing 1 and the valve housing 16, respectively. Movement of the piston 23A is limited by a washer 30 between the housings 1 and 16, the washer 30 having a slit which constitutes the venting passageway 25 communicating with chamber 31 formed between the pistons 23A and 23B. Failure of either of the piston seals 26A, 26B will be detected by the leakage of fluid into the chamber 31 and through the slit.

The primary chamber 4 of the master cylinder is connected to the rear wheel brakes through a chamber 32 in the valve assembly and the control valve 11, and the secondary chamber is connected directly to the front wheel brakes. The rear wheel brakes are also connected directly to a chamber 33 in the valve assembly 15, this chamber 33 having a bleed port (not shown).

In normal operation the pistons 23A and 23B are brought into abutting engagement by substantially equal pressure in chambers 5 and 33. As the operating or braking pressure is increased the control valve cuts in so that the pressure in chamber 33 is less than that in chamber 32. The pistons 23A and 23B then move to the right to take up any clearance between the piston 23B and the ball 21. The ball 21 is normally held against its seat under the action of the spring 22 plus unmodified pressure in chamber 32.

In the event of a pressure failure in the pressure line to the front wheel brake, and upon operation of the brake, the secondary piston 3 bottoms in the chamber 5 and near the end of its travel it engages and moves to the right the pistons 23A and 23B to move the ball 21 from its seat. Pressure fluid in chamber 32 then passes through the chamber 33 past the ball 21 and from there directly to the rear brakes so that the control valve 11 is by-passed and the full operating pressure is applied to the rear brakes.

It will be appreciated that some mis-alignment between the bore in the housing 1 in which the piston 23A slides and the bore in the valve assembly 15 in which the piston 23B slides is permissible since the pistons are separate.

It will be appreciated that although the above described embodiments are presently preferred, modifications are possible within the scope of the invention. For example, the ball 21 may be replaced by a member having a cylindrical part and a coned end for engaging the seat. The cylindrical part may be extended to provide a push rod to operate a warning device of a known type.

Further, instead of by-passing the control valve 11 by the actuation of the further valve, constituted by the port 13 and secondary piston 3 in the embodiment of FIG. 1 and the ball valve in the embodiment of FIGS. 2, 3 and 4, it is possible to disable the control valve 11 directly. This may be achieved, for example, by an arrangement in which excess movement of the push rod bring a mechanical abutment into a position in which it obstructs operating movement of a control valve piston thereby preventing the control valve from "cutting-in". In this case the pressurised fluid would still pass from the primary chamber through the control valve, but the full pressure would be transmitted to the rear wheel brake.

What I claim is:

1. In a vehicle braking system comprising a master cylinder having primary and secondary pressure chambers and primary and secondary pistons slidable in said chambers, mechanical actuating means for effecting movement of said primary and secondary pistons to generate pressure in the respective chambers, first and second fluid pressure operated brakes operatively connected to the respective primary and secondary pressure chambers, a fluid pressure proportioning valve between said primary pressure chamber and the brake operatively connected thereto, disabling means for disabling the proportioning effects of said proportioning valve, and means in said master cylinder for directly and positively operating said disabling means by the secondary piston upon predetermined excess movement thereof in response to loss of fluid pressure in the secondary pressure chamber following operation of said pistons to apply said brakes.

2. In the system according to claim 1 wherein the disabling means comprises a port in said master cylinder connected to one of said wheel brakes, and the means in said master cylinder for operating said disabling means comprises said secondary system cooperating with said port to define a normally closed valve which is opened by said predetermined excess movement of said secondary piston to admit pressure from said primary chamber to said wheel brake.

3. In the system according to claim 1 wherein said disabling means comprises a further normally closed valve provided externally of said master cylinder, said operating means in said master cylinder comprising a valve stem on said further valve and extending into said master cylinder, said stem being engageable by said secondary piston to open said valve upon said predetermined excess movement of said secondary piston.

4. In the system of claim 3 wherein said stem extends into said master cylinder intermediate the ends thereof, and wherein said secondary piston includes a recess having aubtment means therein, said valve stem in normal operation extending into said recess clear of said abutment means but being engaged by said abutment means to open said valve upon said predetermined excess movement of said secondary piston.

5. In the system according to claim 3 wherein said valve stem extends into the secondary chamber of said master cylinder and is directly engageable by said secondary piston upon predetermined excess movement thereof following loss of pressure in said secondary chamber.

6. In the system according to claim 4, wherein said primary chamber constitutes said source and said valve stem extends into said secondary chamber and is engageable by said secondary piston upon predetermined excess movement thereof following loss of pressure in said secondary chamber.

7. In the system according to claim 6, wherein said master cylinder has an end wall which constitutes a wall of said secondary chamber, and wherein said valve stem extends through said wall, whereby it is engageable by said secondary piston as the latter bottoms in said cylinder.

* * * * *